United States Patent [19]

Anderson et al.

[11] Patent Number: 4,832,178

[45] Date of Patent: May 23, 1989

[54] CONTAINER METERING DEVICE

[75] Inventors: David L. Anderson, Alexandria; James F. Korkowski, Brandon, both of Minn.

[73] Assignee: APV Douglas Machine Corporation, Alexandria, Minn.

[21] Appl. No.: 193,537

[22] Filed: May 12, 1988

[51] Int. Cl.$^4$ ............................................. B65G 47/26
[52] U.S. Cl. ................................... 198/461; 198/419.3
[58] Field of Search ............... 198/425, 429, 430, 459, 198/461

[56] References Cited

U.S. PATENT DOCUMENTS

| | | | |
|---|---|---|---|
| 3,845,852 | 11/1974 | Langen et al. | 198/425 |
| 3,872,647 | 3/1975 | Langen et al. | 198/425 |
| 3,902,587 | 9/1975 | Checcucci | 198/425 |
| 4,195,723 | 4/1980 | Loewenthal | 198/461 |
| 4,296,590 | 10/1981 | Focke | 198/425 X |
| 4,320,840 | 3/1982 | Braschos | 198/437 X |
| 4,457,121 | 7/1984 | Johnson et al. | 53/247 X |
| 4,552,261 | 11/1985 | Raudat et al. | 198/425 |
| 4,637,509 | 1/1987 | Raudat et al. | 198/425 |

OTHER PUBLICATIONS

StandardKnapp, Spectrum Tray Packers, Model 1000/1500.
APV Douglas Machine Corp., Pin Infeed.

*Primary Examiner*—Frank E. Werner
*Assistant Examiner*—Lyle K. Kimms
*Attorney, Agent, or Firm*—Peterson, Wicks, Nemer & Kamrath

[57] ABSTRACT

A device (10) for metering containers (14) for use in packaging machines is disclosed as including a pin system (11) which is pivotally mounted about its drive shaft (22) relative to a conveyor (54). Pin system (11) includes a driven flexible member in the form of cross bars (16) mounted to a roller chain (18) in a generally elliptically shaped endless loop, with the pins (12) extending form the cross bars (16) and being operatively attached to cam followers (20) thereby. The elliptically shaped endless loop is supported by a cam support (24) extending between drive and idler sprockets (28, 32) for continuously changing the pitch angles of the pins (12) along a portion of the endless loop. The pin system (11) is variably positioned relative to the conveyor (54) by pivoting the pin system (11) about the drive shaft (22) such that the containers (14) initially contact the pins (12) at different segments of the endless loop portion along the cam support (24) and sprockets (28, 32) and are inserted into the windows between adjacent containers (14) to allow the device (10) to be easily and quickly changed over to meter different sized containers (14). In the preferred form, the pin system (11) is pivoted by a crank arm assembly (40, 42) which is pivoted by a worm gear drive (46, 48) rotated by a hand wheel (52).

21 Claims, 1 Drawing Sheet

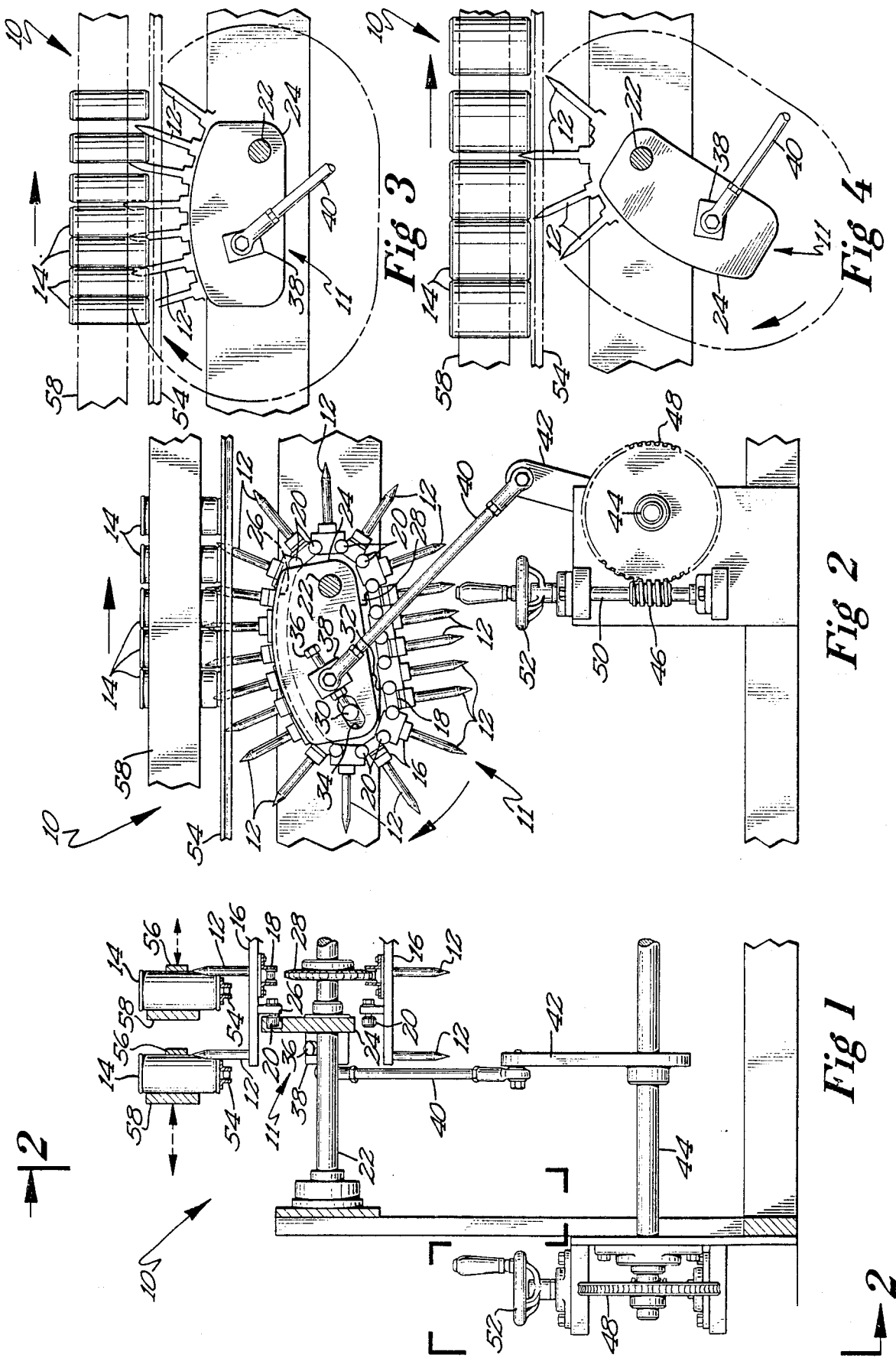

4,832,178

CONTAINER METERING DEVICE

BACKGROUND

The present invention relates to metering devices, specifically to container metering devices, and particularly to container metering devices especially adapted for use in packaging machines.

In a typical packaging operation, containers come to a packaging machine in a single random lane. The containers are then grouped and divided into lanes corresponding to the eventual pack pattern in the packaging for the containers. Each of the lanes must then be controlled as to the number of containers released to give the total number required for the pack pattern. This control is accomplished by providing a separation between the containers in the lane to allow mechanical counting, to allow introduction of an overhead flight, or for the like.

A need has arisen for a method providing separation of a range of varying sized products which can be easily and simply achieved when it is desired to meter different sized containers without the use of change parts.

SUMMARY

The present invention solves this need and other problems in the area of container metering by providing, in a first preferred aspect, an improved pin system including a portion of the endless loop of the flexible member carrying the pins having pin pitch angles which continuously change. The portion of the flexible member is variably positioned relative to the container conveyor so that the pins are insertable into windows between adjacent containers on the conveyor. Thus, the metering device can be easily and quickly changed over for different sized containers by changing the positioning of the pin system relative to the container conveyor.

In another preferred aspect of the present invention, the pin system is pivotably mounted relative to the container conveyor between a first position where the containers initially contact a first segment of the pin system and a second position where the containers initially contact a second segment of the pin system where the pitch angles of the pins are different from the pitch angles of the pins in the first segment. Thus, the metering device can be easily and quickly changed over for different sized containers by pivoting the pin system between its first and second positions.

It is thus an object of the present invention to provide a novel device for metering containers.

It is further an object of the present invention to provide such a novel container metering device which provides separation of a wide range of varying sized products.

It is further an object of the present invention to provide such a novel container metering device which can be easily and quickly changed over to meter different sized containers.

It is further an object of the present invention to provide such a novel container metering device which includes no change parts for different sized containers.

It is further an object of the present invention to provide such a novel container metering device which is mechanically simple.

It is further an object of the present invention to provide such a novel container metering device which may be fine adjusted during operation.

It is further an object of the present invention to provide such a novel container metering device which does not include a sinusoidal drive.

It is further an object of the present invention to provide such a novel container metering device especially adapted for use in packaging machines.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows an end elevational view of a container metering device according to the preferred teachings of the present invention.

FIG. 2 shows a sectional view of the container metering device of FIG. 1 according to section line 2—2 of FIG. 1.

FIGS. 3 and 4 show diagramatic views of the container metering device of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "rows", "lanes", "end", "first", "second", "below", "above", "beyond", "raised", "lowered", and similar terms are used herein, it should be understood that these terms have reference only to the structure shown in the drawings as it would appear to a person viewing the drawings and are utilized only to facilitate describing the invention.

DESCRIPTION

A device for metering containers such as bottles and cans on the infeed to a packaging machine according to the preferred teachings of the ppresent invention is shown in the drawings and generally designated 10. Specifically, in the most preferred form, metering device 10 includes a pin system 11 generally including a plurality of pins 12 corresponding to the number of rows of containers 14 desired to be metered. Pins 12 are mounted to cross bars 16 mounted on and around a flexible member in the form of an endless loop such as a roller chain 18 as shown. Cam followers 20 are operatively attached to pins 12 by mounting on cross bars 16 opposite pins 12 and in the most preferred form are shown as rollers which are rotatably mounted to brackets extending from cross bars 16.

System 11 of device 10 further includes a drive shaft 22 which is rotatably supported and driven by any suitable means. Pivotally mounted to shaft 22 are generally elliptically shaped cam supports 24 including cam tracks 26 for engaging and guiding cam followers 20. In the most preferred form, track 26 is in the form of a channel having a French curve shape and a generally rectangular cross section formed in cam support 24. Rotatably fixed to shaft 22 are sprockets 28. Sprockets 28 extend below and beyond the pivotally mounted end of cam supports 24 and cam supports 24 extend above sprockets 28 with cam track 26 also being positioned generally above sprockets 28. A second idler shaft 30 is rotatably mounted between the free ends of cam supports 24 and includes a second set of sprockets 32 rotatably mounted thereto, with sprockets 32 in the preferred form having a diameter generally equal to the diameter of sprockets 28. In the most preferred form, shaft 30 is mounted in elongate slots 34 formed in cam supports 24 to allow chain tightness adjustment in any usual manner such as by use of a bolt 36 threadably mounted to a pedestal 38 formed on cam support 24. Sprockets 32 extend below and beyond the free end of cam supports 24 and cam supports 24 extend above sprockets 32 with cam track 26 also being positioned generally above sprockets 32. It can then be appreciated that cross bars 16 and roller chain 18 are supported by cam support 24 and sprockets 28 and 32 with cross bars 16 located above cam support 24 being supported by cam followers 20 located within cam track 26 while roller chain 18 is spaced from sprockets 28 and 32 and with cross bars 16 located below and to the sides of cam support 24 being supported by roller chain 18 located upon and being supported by sprockets 28 and 32 while cam followers 20 are spaced from cam support 24.

For purposes of pivoting pin system 11 about drive shaft 22, a turnbuckle 40 is provided having a first end pivotally mounted to pedestal 38 of cam support 24 about a first pivot axis and having a second end pivotally mounted to the free end of a crank arm 42 about a second pivot axis parallel to and spaced from the first pivot axis. Crank arm 42 is rotatably fixed to a shaft 44 which is rotatably supported generally parallel to and spaced from the first and second pivot axes by any suitable means. Shaft 44 is rotated by a worm gear 46 which engages a gear 48 rotatably fixed to shaft 44. Gear 46 in turn is rotatably fixed to a shaft 50 which is rotatably supported by any suitable means and which may be manually rotated such as through the use of a hand wheel 52.

Containers 14 are supported by a conveyor 54 such as a flight chain, with conveyor 54 located such that pins 12 of cross bars 16 located above sprockets 28 extend above the top surface of conveyor 54 and with pins 12 of cross bars 16 located along cam support 14 being positionable to extend from positions below to positions above the top surface of conveyor 54 at various heights. Containers 14 are held on conveyor 54 by first ad second rails 56 and 58, with first rail 56 being positioned to extend along and closely adjacent a corresponding row of pins 12 of cross bars 16 and with second rail 58 being generally parallel to and spaced from rail 56 a distance generally equal to the lateral dimension or diamter of containers 14 for receiving containers 14 between rails 56 and 58. Rails 56 and 58 must have a sufficient height to contain containers 14 of various sizes on conveyor 54 which in the preferred form is relatively narrow and without great concern on whether containers 14 are perfectly centered on conveyor 54. Rails 56 and 58 are mounted for lateral adjustment by any suitable means. In the most preferred form, rail 56 is located adjacent a row of pins 12 and would require only fine tune adjustment to allow proper entry of pins 12 into the window between containers 14 created by their generally cylindrical outer surface. Rail 58 in the most preferred form is adjustable according to the size of container 14 to insure that containers 14 are generally aligned in a row on conveyor 54.

Now that the basic teachings of container metering device 10 according to the preferred teachings of the present invention have been set forth, the operation and subtle features of device 10 can be explained and appreciated. In a packaging operation, several lanes of product containers 14 enter the infeed of a packaging machine with the outside surface of containers 14 in each lane abutting with each other. Many types of containers 14 which are desired to be packaged do not have flat ends which abut together but rather have cylindrical or other configurations which result in windows, interstices, or spaces between adjacent abutting containers 14 in the lane. Thus, as containers 14 are transported by conveyor 54, pins 12 of pin system 11 are introduced in the windows between containers 14. The speed of roller chain 18 is faster than conveyor 54 such that containers 14 are pushed by pins 12 creating a gap between adjacent containers 14 or in other words the outer surfaces of adjacent containers 14 do not abut each other. The size of the gap between adjacent containers 14 which is needed in order to allow entry of an overhead flight bar of the packaging machinery which defines the pack pattern can then be controlled by the relative speeds of roller chain 18 and conveyor 54.

Initially, it should be noted that if pins 12 are not parallel to each other but rather are pitched, the spacing between pins 12 varies. The distance of this spacing then depends upon two factors, namely, the pitch angle between adjacent pins 12 and the location of the corresponding points on adjacent pins 12, with the corresponding points on adjacent pins 12 being spaced greater the further the points on pins 12 are from the intersection of the angle. However, due the relatively small length of pins 12 relative to their travel with respect to conveyor 54 and containers 14, the angle between adjacent pins 12 plays a more active role in determining the spacing between pins 12. It can then be appreciated that the generally elliptical shape of roller chain 18 carrying cross bars 16 and specifically, the noncircular or French curve shape of cam track 26 of cam support 24 extending from sprocket 28 continually changes the pitch angle between adjacent pins 12 along a portion of the endless loop of roller chain 18 and specifically generally along the length of cam support 24. Specifically, due to the relatively small radius of sprocket 28, adjacent pins 12 which extend radially from the center thereof have spacings greater than corresponding spacing in adjacent pins 12 which extend from cam follower 12. Further, due to the noncircular configuration of cam track 26 of cam support 24, the pitch angles of adjacent pins 12 continuously change such that the spacing between corresponding points on pins 12 along the length of cam support 24 continuously change. Additionally, due to the pivotal mounting of pin system 11 in device 10 according to the teachings of the present invention, the pitch angle of pins 12 of pin system 11 also change with the positioning of pin system 11 to further enhance the advantages of the generally elliptical shape of pin system 11. Further, the curved nature of cam track 26 of cam support 24 slows down the speeding up of pins 12 entering into sprocket 18 and thus allows for more reliable placement of pins 12 for easier entry and makes the infeed smoother and more continuous than if roller chain 18 extended tangentially from sprocket 28. Thus, a large range of spacings between pins 12 exists which is then utilized by device 10 to allow for providing separation of a large range of varying sized containers 14.

Specifically, pin system 11 is variably positioned relative to conveyor 54 and in the preferred form is pivotally mounted about one end and specifically the center line or axis of sprocket 18 and particularly drive shaft 22 to bring different pins 12 and thus different pin spacing along pin system 11 into initial contact with the lane of containers 14 moving on conveyor 54. Specifically, pin system 11 according to the teachings of the present invention can be positioned between a lowered position where only pins 12 of pin system 11 which extend radially from the center of sprocket 28 extend above conveyor 54 by having cam support 24 at an angle to conveyor 54 with the free end of the cam support 24 being spaced from conveyor 54 and a raised position where all of pins 12 of pin system 11 along the length of cam support 24 extend above conveyor 54 and cam support 24 is generally parallel to coneyor 54. Thus, when pin system 11 is in its lowered position, a first segment of pin system 11 is positioned relative to conveyor 54 such that the entry point of containers 14 into pin system 11 is where the pitch angle and thus the spacing between adjacent pin 12 is the largest and device 10 is able to meter containers 14 of relatively large diameters. When pin system 11 is moved from its lowered position such as by turning hand wheel 52 to cause pivoting of pin system 11 above drive shaft 22 in the most preferred form, a second segment including the French curve of pin system 11 is positioned relative to conveyor 54 such that the entry point of containers 14 into pin system 11 moves from sprockets 28 towards sprockets 32 where adjacent pins 12 have gradually decreasing pitch angles and spacings from those of the first segment such that device 10 is able to meter containers 14 of smaller diameters. Thus device 10 according to the teachings of the present invention allows metering of containers 14 of a range of varying size easily and simply by adjusting the spacing between rails 56 and 58 according to the lateral dimension of containers 14 and by using hand wheel 52 to position pin system 11. Thus, the proper distance between pins 12 may be exposed corresponding to the size of containers 14 desired to be metered and with the entry point of containers 14 into pin system 11 having the appropriate spacings between adjacent pins 12 for containers 14 desired to be metered. Positioning of pin system 11 can be adjusted while device 10 is in operation.

Another major advantage of pin system 11 where pins 12 follow a continuous curve is that pins 12 will always stay rigid. Specifically, if the roller chain and cross bars ran along a flat rail, the pins would be allowed to pitch one way or the other. Thus, a lot of control on fine tuning adjustment is lost in flat type pin systems. According to the teachings of the present invention, pivoting of roller chain 18 and pins 12 is built into pin system 11 utilizing cam followers 20 and cam support 24 to control the pitch angles rather than an external pivot. Thus, device 10 according to the teachings of the present invention allows more accurate fine tuning according to the particular containers 14 being metered since uncontrolled pitching of pins 12 is eliminated due to the shape of cam support 24 and its relationship with sprockets 28.

It can then be appreciated that device 10 according to the teachings of the present invention can meter containers 14 having a vast range of sizes with no or mininal changes in parts. Thus, no change parts are necessary which may be mislaid or lost. Additionally, variation in size metering is easily and quickly accomplished by simply turning hand wheel 52 even during operation of device 10 and is not time consuming and does not require skilled labor as in prior metering devices. Therefore, device 10 accoding to the teachings of the present invention allows quick and easy changeover for containers 14 of different sizes.

Similarly, device 10 according to the teachings of the present invention utilizes only one set of pins 12 in combination with adjustable rails 56 and 58 for each lane of containers 14 to allow changeover easier than prior designs utilizing two sets of pins which may require lateral spacing adjustment between the two sets of pins. However, device 10 could include a second set of laterally adjustable pins 12 for providing control on both sides of containers 14.

According to the teachings of the present invention, device 10 may be mechanically simple and does not require complicated drive systems or other structure allowing for variation in container metering size. For example, the speed of roller chain 18 may be constant allowing a direct drive without the use of drive systems developing a sinusoidal motion to change the pin pitch as the machine cycles. Further, since pin system 11 is rotated around drive shaft 22 due to its pivotal mounting, movement or changing of location of pin system 11 can be easily accomplished with a much simpler construction. Thus, device 10 according to the teachings of the present invention is of a simplified construction having a greatly reduced number of parts.

Now that the basic teachings of the present invention have been explained, many extensions and variations will be obvious to one having ordinary skill in the art. For example, although pins 12 are shown in the drawings as being insertable between each container 14 in the preferred form, the teachings of the present invention may be applicable to separation of groups of containers 14 corresponding to the pack pattern of the container packaging.

Although pins 12 having generally cylindrical configurations are shown in the drawings in the most preferred form, pins 12 may take other forms such as plates to transport and separate containers 14 on conveyor 54 according to the teachings of the present invention.

Although in the preferred form device 10 according to the teachings of the present invention includes several unique features in what is believed to be a particularly advantageous and synergistic combination, it can be appreciated that such features may be utilized separately and/or in combination with other features to provide a unique container metering device according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. In a device for metering at least one lane of containers on a conveyor and including a pin system having pins, with the containers abutting each other in the lane and having windows between adjacent containers into which the pins of the pin system are insertable, with the pin system including a driven flexible member in the form of an endless loop including the pins, with the improvement comprising, in combination: means for continuously differing the pitch angle of the pins along a portion of the endless loop to vary the spacing between adjacent pins where the pins engage the containers; and means for variably positioning the flexible member relative to the conveyor so that the pins are inserted into the windows of the lane of containers with the containers initially contacting the pins at different positions along the portion of the endless loop to allow the device to be easily changed over to meter different sized containers.

2. The metering device of claim 1 wherein the variably positioning means comprises means for pivoting the portion of the endless loop between lowered and raised positions relative to the conveyor.

3. The metering device of claim 2 wherein the flexible member passes over and is driven by a drive sprocket connected to a drive shaft; and wherein the pivoting means pivots the portion of the endless loop about the drive shaft of the drive sprocket.

4. The metering device of claim 3 wherein the portion of the endless loop includes a curved segment.

5. The metering device of claim 4 wherein the continuously differing means comprises, in combination: an idler sprocket; and a cam support extending between the drive sprocket and the idler sprocket, with the flexible member extending around the idler and drive sprockets and being supported by the cam support.

6. The metering device of claim 5 wherein the cam support includes a cam track including the curved segment; and wherein the continuously differing means further comprises, in combination: following operatively attached to the pins of the flexible member for engagement with and guiding by the cam track of the cam support.

7. The metering device of claim 6 wherein the pivoting means comprises, in combination: a first arm having a first end pivotally mounted about a first axis relative to the idler sprocket and having a second end; a crank arm having a first end pivotally mounted to the second end of the first arm about a second piot axis parallel to the first pivot axis and having a second end; and means for pivoting the crank arm about a third pivot axis parallel to and spaced from the first and second pivot axes.

8. The metering device of claim 7 wherein the crank arm pivoting means comprises, in combination: a crank shaft rotatably fixed to the second end of the crank arm; and worm gear drive means for rotating the crank shaft.

9. The metering device of claim 8 wherein the device meters a plurality of lanes of containers; wherein the pins are mounted to cross bars secured to the flexible member; and wherein the followers are mounted to the cross bars.

10. The metering device of claim 9 wherein the containers are directed along the conveyor by a first rail and a second rail generally parallel to and spaced from the first rail a distance equal to the lateral dimension of the containers, with at least one of the first and second rails being adjustable according to the size of the containers.

11. The metering device of claim 1 wherein the continuously differing means comprises a cam support for supporting the flexible member along the portion of the endless loop.

12. The metering device of claim 11 wherein the portion of the endless loop includes a curved segment.

13. The metering device of claim 12 wherein the cam support includes a cam track including the curved segment; and wherein the continuously differing means further comprises, in combination: followers operatively attached to the pins of the flexible member for engagement with and guiding by the cam track of the cam support.

14. The metering device of claim 13 wherein the variably positioning means comprises means for pivoting the portion of the endless loop between lowered and raised positions relative to the conveyor.

15. In a device for metering at least one lane of containers on a conveyor and including a pin system having pins, with the containers abutting each other in the lane and having windows between adjacent containers into which the pins of the pin system are insertable, with the pin system including a driven flexible member in the form of an endless loop including the pins, with the improvement comprising, in combination: means for pivotably mounting the pin system relative to the conveyor between a first position and a second position, with the pin system including at least a first segment with the pins of the flexible member at a first pin pitch angle and a second segment with the pins of the flexible member at a second pin pitch angle different than the first pin pitch angle, with the containers in the lane initially contacting the pins of the first segment in the first position of the pin system and initially contacting the pins of the second segment in the second position of the pin system to allow the device to be easily changed over to meter different sized containers due to the difference in spacing between adjacent pins arising from the differences in pin pitch angles.

16. The metering device of claim 15 wherein the pin system extends generally angularly with respect to the conveyor in the first position of the pivotably mounting means and the pin system extends generally parallel to the conveyor in the second position of the pivotably mounting means.

17. The metering device of claim 16 wherein the flexible member passes over and is driven by a drive sprocket connected to a drive shaft; wherein the pivotably mounting means pivotably mounts the pin system about the drive shaft of the drive sprocket.

18. The metering device of claim 17 further comprising, in combination: an idler sprocket spaced from the drive sprocket, with the flexible member extending around and being supported by the drive and idler sprockets.

19. The metering device of claim 18 wherein the drive and idler sprockets have generally equal diameters.

20. The metering device of claim 18 further comprising, in combination: means for pivoting the pin system about the drive shaft comprising, in combination: a first arm having a first end pivotally mounted about a first axis relative to the idler sprocket and having a second end; a crank arm having a first end pivotally mounted to the second end of the first arm about a second pivot axis parallel to the first pivot axis and having a second end; and means for pivoting the crank arm about a third pivot axis parallel to and spaced from the first and second pivot axes.

21. The metering device of claim 20 wherein the crank arm pivoting means comprises, in combination: a crank shaft rotatably fixed to the second end of the crank arm; and worm gear drive means for rotating the crank shaft.

\* \* \* \* \*